(12) United States Patent
Bradford, Jr.

(10) Patent No.: US 8,771,129 B2
(45) Date of Patent: Jul. 8, 2014

(54) TWO-MODE PASSIVE LIMITED SLIP DIFFERENTIAL

(71) Applicant: Thomas Edmund Bradford, Jr., Brighton, MI (US)

(72) Inventor: Thomas Edmund Bradford, Jr., Brighton, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 25 days.

(21) Appl. No.: 13/743,003

(22) Filed: Jan. 16, 2013

(65) Prior Publication Data

US 2013/0190126 A1    Jul. 25, 2013

Related U.S. Application Data

(60) Provisional application No. 61/588,279, filed on Jan. 19, 2012.

(51) Int. Cl.
*F16H 48/22* (2006.01)

(52) U.S. Cl.
USPC .......................................... 475/234; 475/240

(58) Field of Classification Search
USPC .................... 475/231, 234, 235, 240
See application file for complete search history.

(56) References Cited

U.S. PATENT DOCUMENTS

| | | | |
|---|---|---|---|
| 6,379,277 B1 | 4/2002 | Victoria et al. | |
| 6,827,663 B2* | 12/2004 | Tucker-Peake | 475/231 |
| 8,556,763 B2* | 10/2013 | Yamaguchi et al. | 475/224 |
| 2006/0014602 A1* | 1/2006 | Sayama | 475/231 |
| 2006/0046888 A1 | 3/2006 | Puiu | |
| 2006/0046890 A1* | 3/2006 | Aikawa | 475/231 |
| 2006/0073931 A1* | 4/2006 | Teraoka | 475/231 |

FOREIGN PATENT DOCUMENTS

GB    1139151 A    1/1969

OTHER PUBLICATIONS

International Search Report mailed Apr. 24, 2013 (PCT/US2013/021859).

* cited by examiner

*Primary Examiner* — David D Le
*Assistant Examiner* — Huan Le
(74) *Attorney, Agent, or Firm* — Dickinson Wright PLLC

(57) ABSTRACT

A limited slip differential assembly includes first and second output gears in constant meshed engagement with a pinion gear. Each of the gears is rotatably positioned within a carrier housing. The second output gear is axially moveable. A rotary to linear motion actuator includes a rotatable first member and a second member axially moveable in response to rotation of the first member. A primary clutch drivingly interconnects the second output gear and the first member of the actuator. The primary clutch includes an apply plate coupled to the second output gear such that an axial force acting on the second output gear during torque transmission through the differential assembly is transferred to the primary clutch via the apply plate. A secondary clutch drivingly interconnects the second output gear and the carrier housing. The second member of the actuator provides an apply force to the secondary clutch.

20 Claims, 1 Drawing Sheet

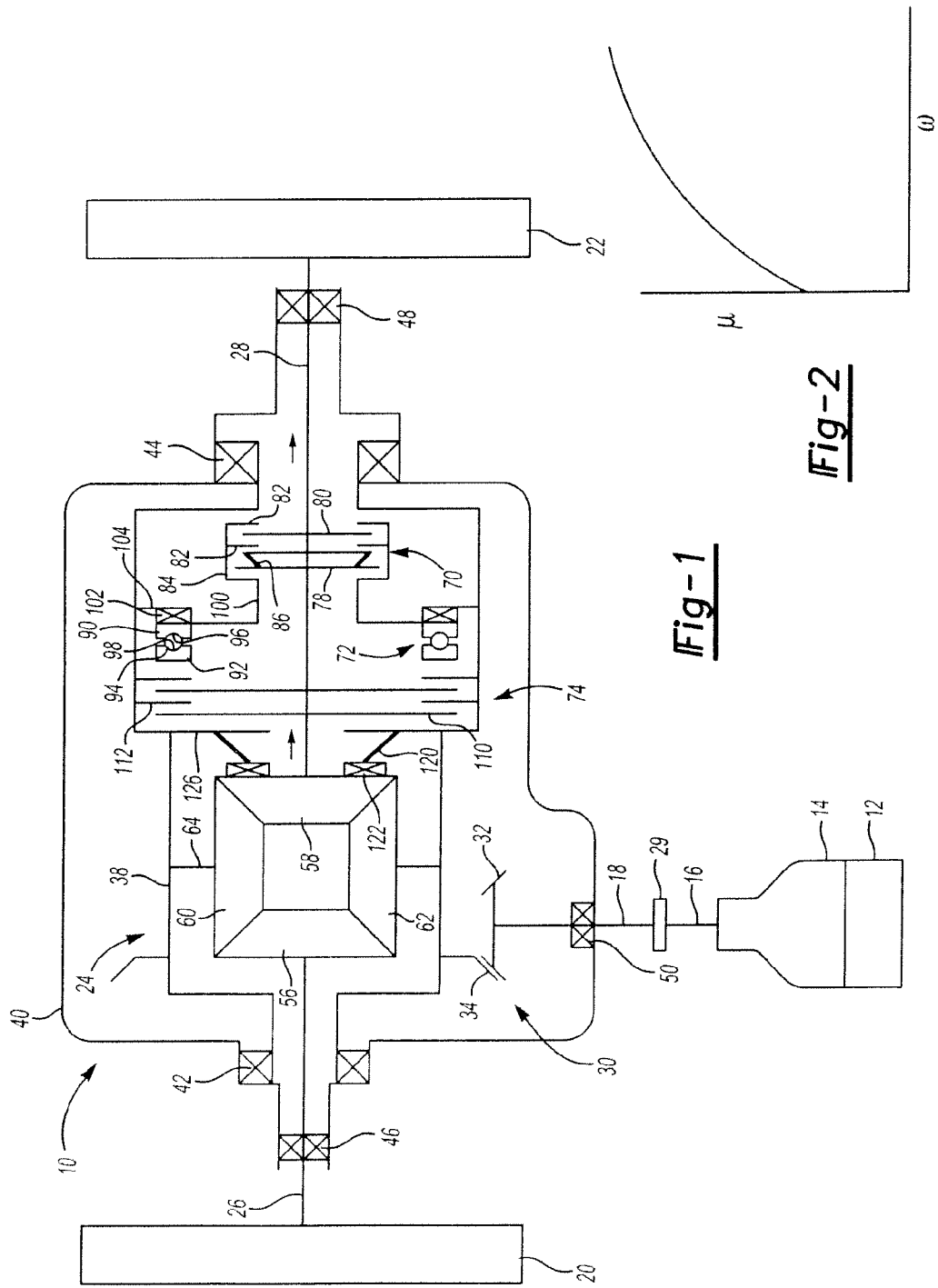

TWO-MODE PASSIVE LIMITED SLIP DIFFERENTIAL

CROSS REFERENCE TO RELATED APPLICATIONS

This application claims the benefit of and priority to U.S. Provisional Application No. 61/588,279 filed on Jan. 19, 2012, the entire disclosure of which is incorporated herein in its entirety.

FIELD

The present disclosure generally relates to drive axles including limited slip differentials. More particularly, a passive, limited slip differential having a dual clutch arrangement is discussed.

BACKGROUND

This section provides background information related to the present disclosure which is not necessarily prior art.

Many automotive vehicles are equipped with limited slip differentials to maintain the transfer of torque to a wheel and tire engaged with a surface at a higher coefficient of friction than another wheel and tire combination on the same axle. More particularly, in an open differential, when one tire to road interface experiences low friction, most or all of the torque transmitted through that drive axle may be provided to the spinning wheel and not the wheel engaging a higher coefficient of friction surface.

Several known limited slip differentials include a passive spring loaded clutch positioned between one of the drive axles and an output member of the differential gear assembly. While these simple early arrangements performed satisfactorily, only one fixed clutch capacity was provided for all vehicle operating conditions. During certain high torque transfer conditions, the capacity of the limited slip differential clutch would be overcome and a desired torque transfer to the driven wheels would not be achieved.

In more recent times, some limited slip differentials have been equipped with variable capacity clutches. Actuators for the variable capacity clutches may include electric motors and electronic control devices that vary the clutch capacity in consideration of the vehicle mode of operation. These assemblies have also functioned satisfactorily. However, electrical connections, electrical components and software may not provide the reliability desired. Accordingly, it may be beneficial to provide an improved mechanical passive limited slip differential.

SUMMARY

This section provides a general summary of the disclosure, and is not a comprehensive disclosure of its full scope or all of its features.

A limited slip differential assembly includes first and second output gears in constant meshed engagement with a pinion gear. Each of the gears is rotatably positioned within a carrier housing. The first and second output gears are adapted to transfer torque to one of vehicle driven wheels. The second output gear is axially moveable. A rotary to linear motion actuator includes a rotatable first member and a second member axially moveable in response to rotation of the first member. A primary clutch drivingly interconnects the second output gear and the first member of the actuator. The primary clutch includes an apply plate coupled to the second output gear such that an axial force acting on the second output gear during torque transmission through the differential assembly is transferred to the primary clutch via the apply plate. A secondary clutch drivingly interconnects the second output gear and the carrier housing. The second member of the actuator provides an apply force to the secondary clutch.

A drive axle and limited slip differential assembly is provided for distributing drive torque to wheels of a vehicle. The drive axle and limited slip differential assembly includes first and second axle shafts rotatably supported in an axle housing. Each axle shaft is adapted to transfer torque to one of the vehicle wheels. A differential gear assembly includes first and second output gears in constant meshed engagement with a pinion gear. Each of the gears is rotatably positioned within a carrier housing. The first output gear is fixed for rotation with the first axle shaft. The second output gear is axially moveable and fixed for rotation with the second axle shaft. A clutch actuator includes a rotatable first member and a second member axially moveable in response to rotation of the first member. A primary clutch drivingly interconnects the second axle shaft and the first member of the actuator. The primary clutch includes an apply plate coupled to the second output gear such that an axial force acting on the second output gear during torque transmission through the differential gear assembly is transferred to the primary clutch via the apply plate. A secondary clutch drivingly interconnects the second axle shaft and the carrier housing. The second member of the actuator provides an apply force to the secondary clutch such that actuation of the primary and secondary clutches occurs passively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic depicting an exemplary vehicle equipped with the drive axle and limited slip differential assembly as described in the present disclosure; and FIG. 2 is a graph relaying coefficient of friction and angular speed between members of a clutch.

Corresponding reference numerals indicate corresponding parts throughout the several views of the drawings.

DETAILED DESCRIPTION

Example embodiments will now be described more fully with reference to the accompanying drawings.

Referring to FIG. 1, an exemplary drive axle assembly 10 is schematically shown interactively associated with a source of power, such as an engine 12, through a transmission 14 which may be of either the manual or automatic type. Transmission 14 includes an output shaft 16 drivingly coupled to an input shaft 18 of drive axle assembly 10. Wheels 20, 22 are connected at opposite ends of drive axle assembly 10. Drive axle 10 is operable to transmit drive torque from engine 12 and transmission 14 to driven wheels 20, 22. More particularly, a differential assembly 24 provides output torque to a first axle shaft 26 and a second axle shaft 28. A coupling 29 drivingly interconnects transmission output shaft 16 and input shaft 18.

It should be appreciated that the drive axle 10 may be positioned at any suitable location in a vehicle and operate as a front driving axle, a rear driving axle or an intermediate driving axle. Furthermore, drive axle 10 may form a portion of a two-wheel drive vehicle drivetrain or a four-wheel drive vehicle drivetrain. As such, coupling 29 may alternately provide torque to a transfer case or some other torque transfer mechanism (not shown) instead of directly transferring torque to input shaft 18 as depicted in FIG. 1. Coupling 29 may also function as a torque coupling for adaptively regulating the drive torque transferred to input shaft 18 when drive axle 10 is utilized as a secondary axle in an all-wheel drive vehicle or a four-wheel drive vehicle. In an alternate example, differential assembly 24 may form a portion of a rear transaxle transmission where output shaft 16, coupling 29, and input shaft 18 are not needed. In such an arrangement, drive torque would be transmitted from the power source through the transaxle transmission final drive to an input number of differential assembly 24. In yet another arrangement, differential assembly 24 may similarly be incorporated within a front transmission transaxle for a limited slip front wheel drive application.

Drive axle assembly 10 includes a reduction gearset 30 including a pinion gear 32 meshingly engaged with a ring gear 34. Pinion gear 32 is fixed for rotation with input shaft 18. Ring gear 34 is fixed for rotation with a differential housing 38 of differential assembly 24. Differential housing 38 acts as the input number for differential assembly 24 and receives drive torque from the vehicle's powertrain. Differential assembly 24 is supported for rotation within a drive axle housing 40 by a first bearing 42 and a second bearing 44. First axle shaft 26 is supported for rotation within housing 40 by a bearing 46. In similar fashion, second axle shaft 28 is supported for rotation within housing 40 by a bearing 48. Another bearing 50 rotatably supports input shaft 18.

Differential assembly 24 includes a first side gear 56 fixed for rotation with first axle shaft 26 and a second side gear 58 fixed for rotation with second axle shaft 28. Pinion gears 60, 62 are supported for rotation on a pinion shaft 64 that is fixed to differential housing 38. While a bevel gear arrangement is depicted in the Figure, it should be appreciated that the present disclosure also relates to planetary or crown differentials as well. Specifically, any differential assembly having an input number receiving the input torque, a pair of output numbers connected to the axle shafts, and a gearset distributing torque between the input numbers and the pair of output numbers is considered to be within the anticipated scope of the present disclosure.

A primary clutch 70, a ball ramp actuator 72, and a secondary clutch 74 cooperate with one another to provide a limited slip function for differential 24. Primary clutch 70 includes an apply plate 78 fixed to second axle shaft 28 for concurrent rotation and axial translation therewith. Primary clutch 70 includes a plurality of inner clutch plates 80 that are fixed for rotation with and axially moveable relative to second axle shaft 28. A plurality of outer clutch plates 82 are interleaved with inner clutch plates 80 as well as being fixed for rotation with and axially moveable relative to a drum 84. A spring 86 urges inner clutch plates 80 and outer clutch plates 82 into contact with one another to provide a minimum preload or first torque capacity of primary clutch 70. Second axle shaft 28 and apply plate 78 are at their leftmost position as shown in FIG. 1 when primary clutch 70 provides its lowest torque capacity.

Ball ramp actuator 72 is an example one type of rotary-to-linear actuator capable of use with differential assembly 24. Ball ramp actuator 72 includes a first rotary or input member 90, a second rotary or output member 92, and a plurality of rollers 94 positioned therebetween. Rotary input member 90 includes a tapered groove 96 and rotary output member 92 includes a similarly-shaped and opposing tapered groove 98. A plurality of pairs of tapered grooves 96, 98 are circumferentially spaced apart from one another. One of rolling elements 94 is positioned within each pair of opposing tapered grooves 96, 98. Relative rotation between first rotary member 90 and second rotary member 92 causes second rotary member 92 to axially move.

A hub 100 fixes drum 84 for rotation with first rotary member 90. A bearing 102 allows relative rotation between rotary member 90 and a radially inwardly extending web 104 of differential housing 38. Second rotary member 92 is fixed for rotation with, but is axially moveable relative to, differential housing 38.

Secondary clutch 74 includes a plurality of inner clutch plates 110 fixed for rotation with and axially moveable relative to second axle shaft 28. A plurality of outer clutch plates 112 are interleaved with inner clutch plates 110 and fixed for rotation with differential housing 38. Such torque transfer acts to bias torque transfer across differential assembly 24, thereby limiting slip between the axle shafts. Secondary clutch 74 transfers torque between second axle shaft 28 and differential housing 38. A spring 120 and bearing 122 are positioned between another radially inwardly extending web 126 of differential housing 38 and second side gear 58. Spring 120 urges second side gear 58, second axle shaft 28 and apply plate 78 toward their leftmost position to assist in establishing the first torque capacity of primary clutch 70.

In operation, drive axle assembly 10 responds to two inputs to vary the torque capacity of secondary clutch 74. When a vehicle containing drive axle assembly 10 is at rest, spring 86 applies a predetermined load to primary clutch 70 to define a base or minimum clutch capacity of primary clutch 70. When relative rotation occurs between differential housing 38 and second axle shaft 28, torque is transferred to ball ramp actuator 72 up to the capacity of primary clutch 70. Relative rotation occurs between first rotary member 90 and second rotary member 92 to provide an apply force to secondary clutch 74. The torque capacity of secondary clutch 74 is a minimum at this time.

An additional input may be provided to primary clutch 70 based upon the magnitude of the input torque provided to differential assembly 24. As the input torque provided to input shaft 18 increases, a tendency for first side gear 56 and second side gear 58 to space apart from one another increases. The axial load applied to first side gear 56 is reacted by differential housing 38. However, the axial load applied to second side gear 58 is transferred to second axle shaft 28, apply plate 78 and the inner and outer clutch plates 80, 82 of primary clutch 70. In this manner, the torque capacity of primary clutch 70 is increased based on the axial side force from second side gear 58 adding to the load provided by spring 86. The torque applied to ball ramp actuator 72 may be increased to the new torque capacity of primary clutch 70. It follows that the apply load to secondary clutch 74 is also increased.

As another passive control feature, primary clutch 70 is provided with friction materials on at least one of inner clutch plates 80 or outer clutch plates 82 with a friction material exhibiting characteristics as depicted in FIG. 2. As the relative angular velocity between inner clutch plates 80 and outer clutch plates 82 increases, the coefficient of friction between the two plates increases. In application, when a relatively high rotational speed exists between differential housing 38 and second axle shaft 28, indicative of increased slip, the coefficient of friction between the relatively rotating members of primary clutch 70 increases thereby increasing the capacity of primary clutch 70. Stated another way, for a constant apply load provided to primary clutch 70, the torque capacity of the clutch increases as the coefficient of friction between the inner and outer plates increases.

Based on the geometrical configuration and friction material characteristics previously described, drive axle assembly 10 operates as a two-mode or two-input passive limited slip differential. The torque capacity of secondary clutch 74 is varied based on the input torque provided to the input component of differential assembly 24 as well as the relative rotational speed difference between second axle shaft 28 and differential housing 38. A robust, variable capacity limited slip differential is provided without the use of electric actuators or electronic control devices.

Accordingly, the present disclosure is directed to an improved alternate solution for passively-activated limited slip differential assemblies of the type particularly adapted for use in motor vehicle applications. As noted, the limited slip differential assembly of the present disclosure utilizes a geared differential (i.e. bevel, planetary or crown type) having an input component receiving input torque, a pair of output components coupled to the axle shafts, and a gearset facilitating speed differentiation between the pair of output components. The primary function is to provide a torque path from one axleshaft to the input component of the geared differential. This is accomplished via use of the primary and secondary clutches which are activated using two methods of operation. The secondary clutch provides the torque transfer from the one axleshaft to the input side of the geared differential. The primary clutch functions to provide control over the apply force acting on the secondary clutch. The torque capacity and differential speed between the input and output numbers of the primary clutch control the activation force required for operating the rotary-to-linear activator disposed between the primary and secondary clutches. Increasing the activation force results in increasing apply forces exerted on the secondary clutch.

The control factors for the primary clutch are based on two distinct methods of clutch control. First, activation of primary control is dependent on the axial loading within the geared differential causing the two output components to separate and which directly influences the clamping force applied to the primary clutch. Increasing such clamping forces the primary clutch functions to increase the clutch capacity of the secondary clutch which, in turn, controls the torque biasing across the geared differential. Secondly, activation of the primary clutch is dependent of the differential speed between its input and output members and the functional characteristics of the clutch plates. Increasing the coefficient of function results in an increase in the torque capacity of the primary clutch. In turn, increasing the torque capacity of the primary clutch results in an increase in the apply force on the secondary clutch, thereby increasing the torque capacity of the secondary clutch. This configuration provides a two-mode passive limited slip differential that advances the technology of passively-activated limited slip devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A limited slip differential assembly for distributing drive torque to wheels of a vehicle, comprising:
    a differential gear assembly including first and second output gears in constant meshed engagement with a pinion gear, each of the gears being rotatably positioned within a carrier housing, the first and second output gears each being adapted to transfer torque to one of the driven wheels, the second output gear being axially moveable;
    a rotary to linear motion actuator including a rotatable first member and a second member axially moveable in response to rotation of the first member;
    a primary clutch drivingly interconnecting the second output gear and the first member of the actuator, the primary clutch including an apply plate coupled to the second output gear such that an axial force acting on the second output gear during torque transmission through the differential assembly is transferred to the primary clutch via the apply plate; and
    a secondary clutch drivingly interconnecting the second output gear and the carrier housing, the second member of the actuator providing an apply force to the secondary clutch.

2. The assembly of claim 1, wherein the primary clutch includes interleaved clutch plates.

3. The assembly of claim 2, wherein the primary clutch includes a spring biasing the interleaved clutch plates into contact with each other to define a minimum primary clutch capacity.

4. The assembly of claim 3, wherein the second output member axial force acts in the same direction as the spring to increase the force on the clutch plates and define a primary clutch capacity greater than the minimum primary clutch capacity.

5. The assembly of claim 1, wherein the actuator includes a ball ramp actuator.

6. The assembly of claim 5, wherein the second member of the actuator is restricted from rotating relative to the carrier housing.

7. The assembly of claim 2, wherein the secondary clutch includes interleaved clutch plates.

8. The assembly of claim 7, wherein the carrier housing, the second output gear, the primary clutch plates and the second clutch plates each rotate about a common axis.

9. The assembly of claim 1, wherein the first and second output gears are bevel shaped.

10. The assembly of claim 1, further including a final drive gear fixed to the carrier housing.

11. The assembly of claim 1, further including a spring urging the second output gear toward the pinion gear to urge the apply plate toward a retracted position.

12. A drive axle and limited slip differential assembly for distributing drive torque to wheels of a vehicle, comprising:
    an axle housing;
    first and second axle shafts rotatably supported in the axle housing, each axle shaft adapted to transfer torque to one of the vehicle wheels;
    a differential gear assembly including first and second output gears in constant meshed engagement with a pinion gear, each of the gears being rotatably positioned within a carrier housing, the first output gear being fixed for rotation with the first axle shaft, the second output gear being axially moveable and fixed for rotation with the second axle shaft;

a clutch actuator including a rotatable first member and a second member axially moveable in response to rotation of the first member;

a primary clutch drivingly interconnecting the second axle shaft and the first member of the actuator, the primary clutch including an apply plate coupled to the second output gear such that an axial force acting on the second output gear during torque transmission through the differential gear assembly is transferred to the primary clutch via the apply plate; and a secondary clutch drivingly interconnecting the second axle shaft and the carrier housing, the second member of the actuator providing an apply force to the secondary clutch, wherein actuation of the primary and secondary clutches occurs passively.

13. The assembly of claim 12, wherein the primary clutch includes interleaved clutch plates.

14. The assembly of claim 13, wherein the primary clutch includes a spring biasing the interleaved clutch plates into contact with each other to define a minimum primary clutch capacity.

15. The assembly of claim 14, wherein the second output member axial force acts in the same direction as the spring to increase the force on the clutch plates and define a primary clutch capacity greater than the minimum primary clutch capacity.

16. The assembly of claim 15, wherein the secondary clutch includes interleaved clutch plates.

17. The assembly of claim 16, wherein the carrier housing, the second output gear, the primary clutch plates and the second clutch plates each rotate about a common axis.

18. The assembly of claim 12, wherein the actuator includes a ball ramp actuator.

19. The assembly of claim 18, wherein the second member of the actuator is restricted from rotating relative to the carrier housing.

20. The assembly of claim 12, wherein the first and second output gears are bevel shaped.

* * * * *